US012382277B2

(12) United States Patent
Tao et al.

(10) Patent No.: US 12,382,277 B2
(45) Date of Patent: Aug. 5, 2025

(54) METHOD AND APPARATUS FOR NETWORK CAPABILITY EXPOSURE

(71) Applicant: Telefonaktiebolaget LM Ericsson (publ), Stockholm (SE)

(72) Inventors: Jingrui Tao, Guangzhou (CN); Yun Zhang, Guangzhou (CN); Fengpei Zhang, Guangzhou (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 415 days.

(21) Appl. No.: 17/907,259

(22) PCT Filed: Mar. 26, 2020

(86) PCT No.: PCT/CN2020/081466
§ 371 (c)(1),
(2) Date: Sep. 24, 2022

(87) PCT Pub. No.: WO2021/189369
PCT Pub. Date: Sep. 30, 2021

(65) Prior Publication Data
US 2023/0113108 A1    Apr. 13, 2023

(51) Int. Cl.
*H04L 12/24* (2006.01)
*G06F 9/54* (2006.01)
*H04L 67/51* (2022.01)
*H04W 8/18* (2009.01)
*H04W 12/06* (2021.01)

(52) U.S. Cl.
CPC ............ *H04W 8/183* (2013.01); *G06F 9/546* (2013.01); *H04L 67/51* (2022.05); *H04W 12/06* (2013.01)

(58) Field of Classification Search
None
See application file for complete search history.

(56) References Cited

U.S. PATENT DOCUMENTS

2019/0020549 A1* 1/2019 Kim .................... H04L 41/0893
2019/0182717 A1   6/2019 Ye et al.

FOREIGN PATENT DOCUMENTS

| CN | 109547513 A | 3/2019 |
| CN | 110048951 A | 7/2019 |
| WO | 2019229492 A1 | 12/2019 |

OTHER PUBLICATIONS

International Search Report and Written Opinion for Application No. PCT/CN2020/081466, Dec. 8, 2020, 10 pages.
(Continued)

*Primary Examiner* — Gary Lafontant
(74) *Attorney, Agent, or Firm* — Nicholson De Vos Webster & Elliott LLP

(57) ABSTRACT

Methods and apparatuses for network capability exposure. A method at a network exposure entity comprises receiving, from a terminal device, a network exposure application programming interface (API) invocation message. The method further comprises validating whether the terminal device is allowed to use the invocated network exposure API. The method further comprises processing the network exposure API invocation message based on the validating result.

20 Claims, 8 Drawing Sheets

(56) References Cited

OTHER PUBLICATIONS

3GPP TS 23.501 V16.3.0, "3rd Generation Partnership Project; Technical Specification Group Services and System Aspects; System architecture for the 5G System (5GS); Stage 2 (Release 16)," Dec. 2019, 417 pages, 3GPP Organizational Partners.

3GPP TS 23.502 V15.4.1, "3rd Generation Partnership Project; Technical Specification Group Services and System Aspects; Procedures for the 5G System; Stage 2 (Release 15)," Jan. 2019, 347 pages, 3GPP Organizational Partners.

3GPP TS 23.502 V16.3.0, "3rd Generation Partnership Project; Technical Specification Group Services and System Aspects; Procedures for the 5G System (5GS); Stage 2 (Release 16)," Dec. 2019, 558 pages, 3GPP Organizational Partners.

3GPP TS 23.682 V16.5.0, "3rd Generation Partnership Project; Technical Specification Group Services and System Aspects; Architecture enhancements to facilitate communications with packet data networks and applications (Release 16)," Dec. 2019, 134 pages, 3GPP Organizational Partners.

3GPP TR 23.722 V15.1.0, "3rd Generation Partnership Project; Technical Specification Group Services and System Aspects; Study on Common API Framework for 3GPP Northbound APIs (Release 15)," Apr. 2018, 65 pages, 3GPP Organizational Partners.

3GPP TS 33.220 V16.0.0, "3rd Generation Partnership Project; Technical Specification Group Services and System Aspects; Generic Authentication Architecture (GAA); Generic Bootstrapping Architecture (GBA) (Release 16)," Sep. 2019, 93 pages, 3GPP Organizational Partners.

3GPP TS 33.401 V16.1.0, "3rd Generation Partnership Project; Technical Specification Group Services and System Aspects; 3GPP System Architecture Evolution (SAE); Security architecture (Release 16)," Dec. 2019, 165 pages, 3GPP Organizational Partners.

3GPP TS 33.501 V16.1.0, "3rd Generation Partnership Project; Technical Specification Group Services and System Aspects; Security architecture and procedures for 5G system (Release 16)," Dec. 2019, 202 pages, 3GPP Organizational Partners.

\* cited by examiner

METHOD AND APPARATUS FOR NETWORK CAPABILITY EXPOSURE

CROSS-REFERENCE TO RELATED APPLICATIONS

This application is a National stage of International Application No. PCT/CN2020/081466, filed Mar. 26, 2020, which is hereby incorporated by reference.

TECHNICAL FIELD

The non-limiting and exemplary embodiments of the present disclosure generally relate to the technical field of communications, and specifically to methods and apparatuses for network capability exposure.

BACKGROUND

This section introduces aspects that may facilitate a better understanding of the disclosure. Accordingly, the statements of this section are to be read in this light and are not to be understood as admissions about what is in the prior art or what is not in the prior art.

To enable operators to use their network programming ability to maximize innovation, shorten time to market and create services for consumers and/or enterprise, 3rd Generation Partnership Project (3GPP) defines Service Capability Exposure Function (SCEF) in fourth generation (4G) network and Network Exposure Function (NEF) in fifth generation (5G) network to expose network capability via an application programming interface (API). The architecture for SCEF and NEF may enable the 3GPP network to securely expose its services and capabilities provided by the 3GPP network interfaces to external 3rd party service provider such as services capability server/an application server (SCS/AS) or application function (AF) entity hosting an application(s).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

There are some problems for the architecture for SCEF and NEF. For example, more and more exposure use cases require that the SCEF/NEF exposes its services and capabilities provided by the 3GPP network interfaces to a user equipment (UE) directly. However the current SCEF and NEF can not expose its services and capabilities provided by the 3GPP network interfaces to the UE directly.

To overcome or mitigate the above mentioned problem or other problems, the embodiments of the present disclosure propose an improved network capability exposure solution which can enable a network exposure entity such as SCEF and/or NEF to expose its services and capabilities provided by the network interfaces to a terminal device such as UE directly. In some embodiments herein, it is provided a solution to solve the security issue for the network exposure entity such as SCEF and/or NEF exposure to UE directly.

In a first aspect of the disclosure, there is provided a method at a network exposure entity. The method comprises receiving, from a terminal device, a network exposure application programming interface, API, invocation message. The method further comprises validating whether the terminal device is allowed to use the invoked network exposure API. The method further comprises processing the network exposure API invocation message based on the validating result.

In an embodiment, validating whether the terminal device is allowed to use the invoked network exposure API may comprise sending, to a data management entity, an authorization request for validating whether the terminal device is allowed to use the invoked network exposure API; and receiving, from the data management entity, an authorization response including the validating result.

In an embodiment, the authorization request may include a user identity of the terminal device and an identity of the invocated network exposure API.

In an embodiment, the authorization request may further include an application identifier of the terminal device.

In an embodiment, the data management entity may comprise at least one of a unified data management, UDM, entity and a home subscriber server, HSS.

In an embodiment, the method may further comprise authenticating the terminal device.

In an embodiment, the terminal device may be authenticated based on subscriber identity module based authentication.

In an embodiment, the network exposure API invocation message may comprise at least one of an event exposure API invocation message; a packet flow description management API invocation message; a parameter provision API invocation message; a device triggering API invocation message; a background data transfer policy negotiation API invocation message; a traffic influence API invocation message; a chargeable party API invocation message; a quality of service API invocation message; a mobile subscriber integrated services digital network less, MSISDN-less, mobile originated short message service API invocation message; a service parameter provision API invocation message; an API support capability API invocation message; a non Internet protocol data delivery, NIDD, configuration API invocation message; a NIDD API invocation message; a network analytics exposure API invocation message; a user equipment radio capability management function provision API invocation message; an enhanced coverage restriction API invocation message; and an apply policy API invocation message.

In an embodiment, the network exposure entity may comprise at least one of a service capability exposure function, SCEF, entity; and a network exposure function, NEF, entity.

In an embodiment, information that what API can be exposed to the terminal device may be stored in subscription data of the terminal device.

In a second aspect of the disclosure, there is provided a method at a terminal device. The method comprises receiving, from an application of the terminal device, an indication message for invoking a network exposure application programming interface, API. The method further comprises transmitting, to a network exposure entity, a network exposure API invocation message.

In a third aspect of the disclosure, there is provided a method at a data management entity. The method comprises receiving, from a network exposure entity, an authorization request for validating whether a terminal device is allowed to use a network exposure application programming interface, API. The method further comprises sending, to the network exposure entity, an authorization response including the validating result.

In a fourth aspect of the disclosure, there is provided a network exposure entity. The network exposure entity comprises a processor; and a memory coupled to the processor, said memory containing instructions executable by said processor, whereby said network exposure entity is operative to receive, from a terminal device, a network exposure application programming interface, API, invocation message. Said network exposure entity is further operative to validate whether the terminal device is allowed to use the invocated network exposure API. Said network exposure entity is further operative to process the network exposure API invocation message based on the validating result.

In a fifth aspect of the disclosure, there is provided a terminal device. The terminal device comprises a processor; and a memory coupled to the processor, said memory containing instructions executable by said processor, whereby said terminal device is operative to receive, from an application of the terminal device, an indication message for invoking a network exposure application programming interface, API. Said network exposure entity is further operative to transmit, to a network exposure entity, a network exposure API invocation message.

In a sixth aspect of the disclosure, there is provided a data management entity. The data management entity comprises a processor; and a memory coupled to the processor, said memory containing instructions executable by said processor, whereby said data management entity is operative to receive, from a network exposure entity, an authorization request for validating whether a terminal device is allowed to use a network exposure application programming interface, API. Said network exposure entity is further operative to send, to the network exposure entity, an authorization response including the validating result from the data management entity.

In a seventh aspect of the disclosure, there is provided a network exposure entity. The network exposure entity comprises a receiving module, a validating module and a processing module. The receiving module may be configured to receive, from a terminal device, a network exposure application programming interface, API, invocation message. The validating module may be configured to validate whether the terminal device is allowed to use the invocated network exposure API. The processing module may be configured to process the network exposure API invocation message based on the validating result.

In an eighth aspect of the disclosure, there is provided a terminal device. The terminal device comprises a receiving module and a transmitting module. The receiving module may be configured to receive, from an application of the terminal device, an indication message for invoking a network exposure application programming interface, API. The transmitting module may be configured to transmit, to a network exposure entity, a network exposure API invocation message.

In a ninth aspect of the disclosure, there is provided a data management entity. The data management entity comprises a receiving module and a sending module. The receiving module may be configured to receive, from a network exposure entity, an authorization request for validating whether a terminal device is allowed to use a network exposure application programming interface, API. The sending module may be configured to send, to the network exposure entity, an authorization response including the validating result.

In a tenth aspect of the disclosure, there is provided a computer program product, comprising instructions which, when executed on at least one processor, cause the at least one processor to carry out any step of the method according to any of the first, second and the third aspects of the disclosure.

In an eleventh aspect of the disclosure, there is provided a computer-readable storage medium storing instructions which when executed by at least one processor, cause the at least one processor to carry out any step of the method according to any of the first, second and the third aspects of the disclosure.

Embodiments herein afford many advantages, of which a non-exhaustive list of examples follows. In some embodiments herein, a solution to secure the end-to-end procedure of API exposure to terminal device is provided. In some embodiments herein, the provided solution can enable the network exposure entity such as SCEF/NEF to expose its service and network capability to the terminal device directly. In some embodiments herein, the application in the terminal device may avoid using the AF/AS/SCS to invoke the network exposure API which may be benefit in some cases such as the AF/AS/SCS cannot support to invoke the network exposure API and can simplify the procedure of network exposure to UE. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 4 shows a diagram of how an UE application can use network exposure though SCS/AS;

DETAILED DESCRIPTION

Figure 1A:
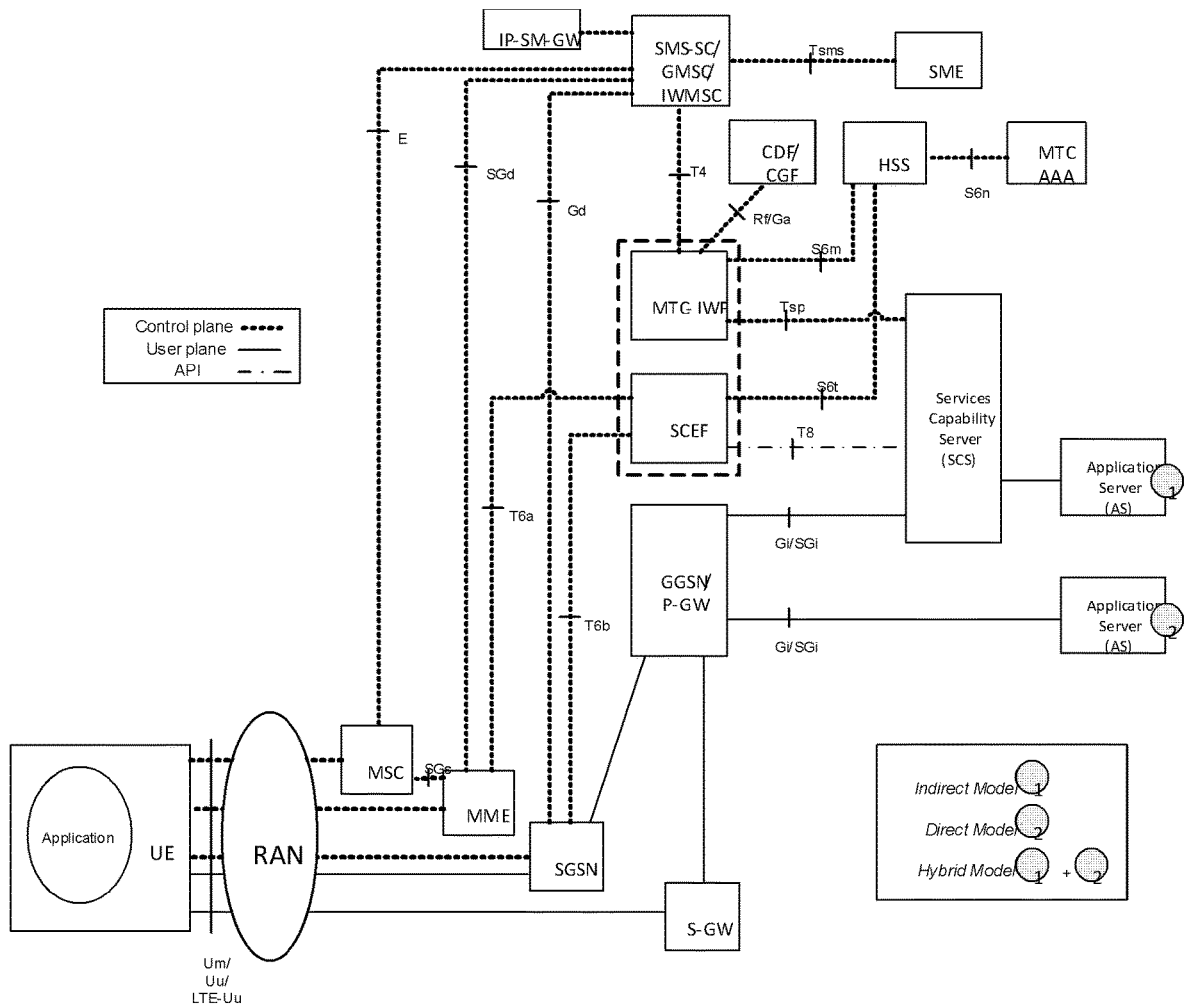
FIG. 1a schematically shows a high level architecture in a 4G network.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable (wireless or wired) communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols. For example, the wireless communication protocols may comprise the first generation (1G), 2G, 3G, 4G, 4.5G, 5G communication protocols, and/or any other protocols either currently known or to be developed in the future.

The term "entity" used herein refers to a network device or network node or network function in a communication network. For example, in a wireless communication network such as a 3GPP-type cellular network, a core network device may offer numerous services to customers who are interconnected by an access network device. Each access network device is connectable to the core network device over a wired or wireless connection.

The term "network function (NF)" refers to any suitable function which can be implemented in a network entity (physical or virtual) of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), etc. For example, the 4G system (such as LTE) may include MME (Mobile Management Entity), HSS (home subscriber server), SCEF, etc. In other embodiments, the network function may comprise different types of NFs for example depending on the specific network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VOIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to 4G and 5G network being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 1B:
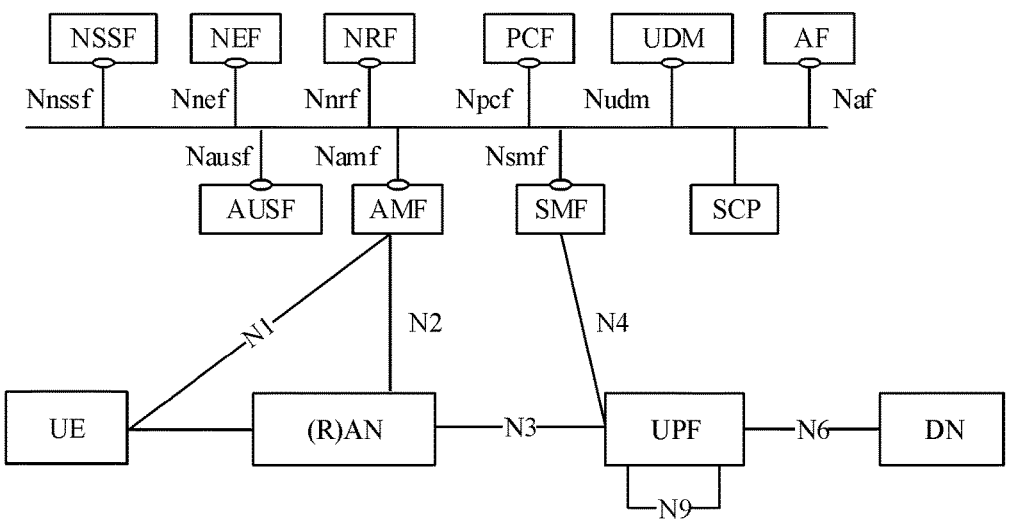
FIG. 1b schematically shows a high level architecture in a 5G network.
Figure 1C:
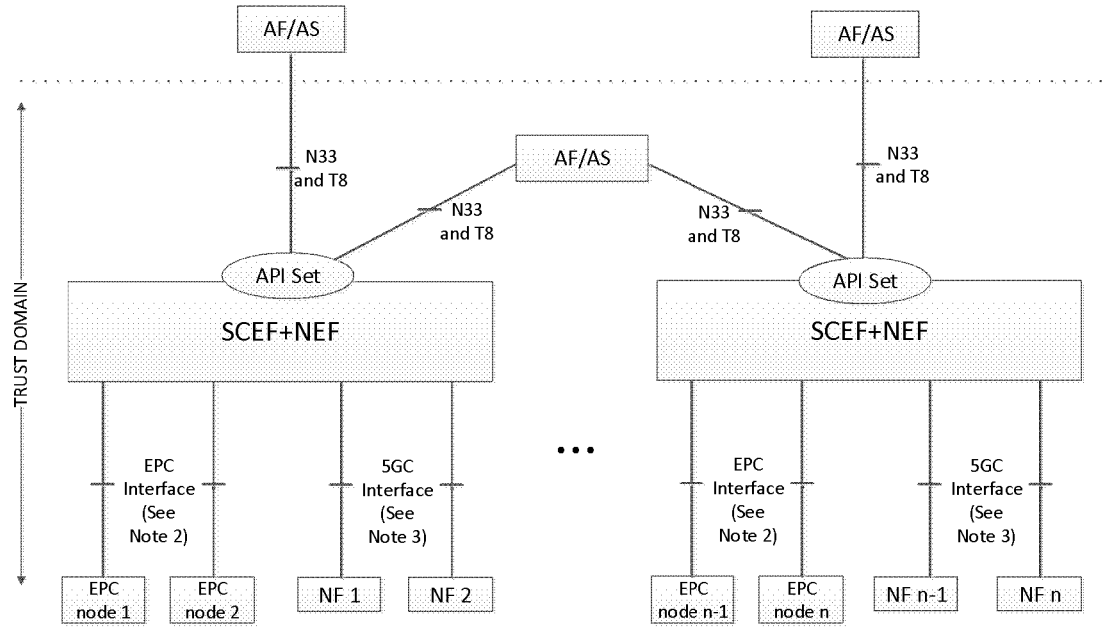
FIG. 1c schematically shows a high level architecture for service exposure for EPC-5GC interworking.

FIGS. 1a-1c show some system architectures in which the embodiments of the present disclosure can be implemented. For simplicity, the system architectures of FIGS. 1a-1c only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

Figure 4:
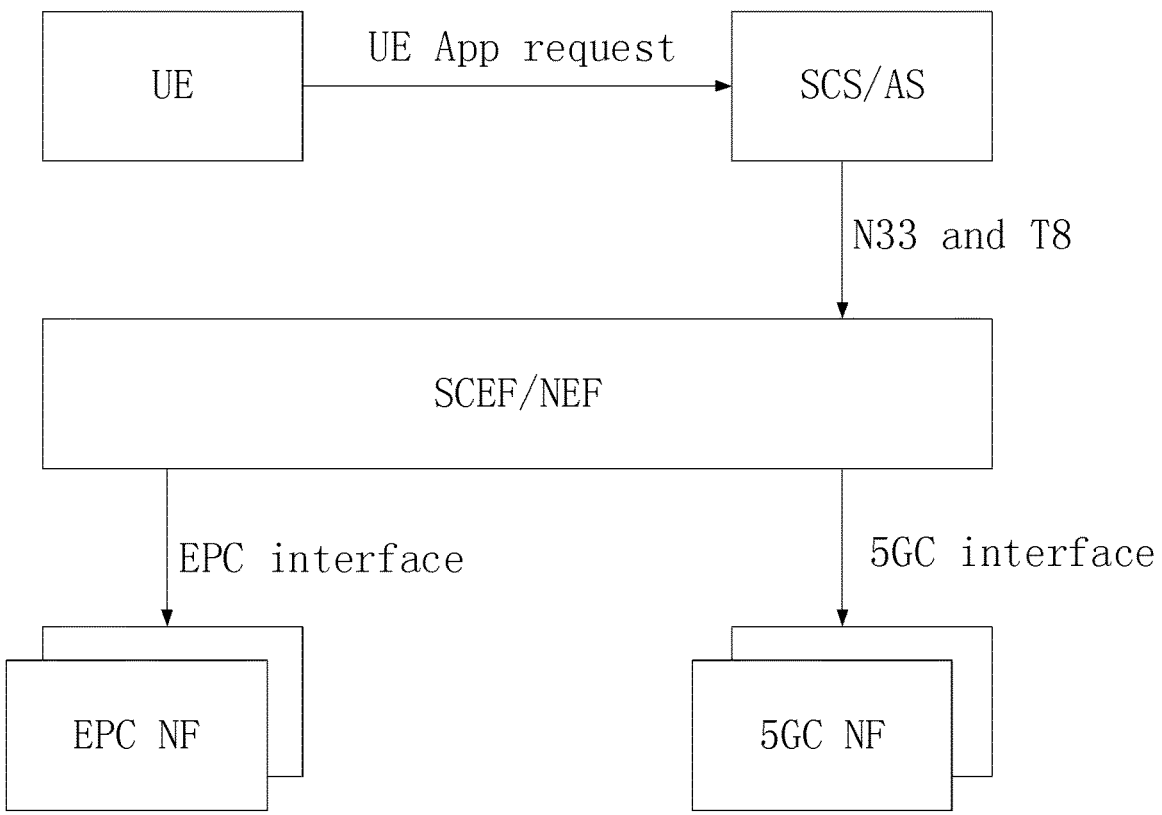

FIG. 1a schematically shows a high level architecture in a 4G network, which is same as FIG. 4.2-1a of 3GPP TS 23.682 V16.5.0, the disclosure of which is incorporated by reference herein in its entirety. The system architecture of FIG. 1a may comprise some exemplary elements such as SCS, AS, SCEF, HSS (home subscriber server), UE, RAN (Radio Access Network), SGSN (Serving GPRS (General Packet Radio Service) Support Node), MME (Mobile Management Entity), MSC (Mobile Switching Centre), S-GW (Serving Gateway), GGSN/P-GW (Gateway GPRS Support Node/PDN (Packet Data Network) Gateway), MTC-IWF (Machine Type Communications-InterWorking Function) CDF/CGF (Charging Data Function/Charging Gateway Function), MTC-AAA (Machine Type Communications-authentication, authorization and accounting), SMS-SC/GMSC/IWMSC (Short Message Service-Service Centre/Gateway MSC/InterWorking MSC) IP-SM-GW (Internet protocol Short Message Gateway). The network elements and interfaces as shown in FIG. 1a may be same as the corresponding network elements and interfaces as described in 3GPP TS 23.682 V16.5.0.

FIG. 1b schematically shows a high level architecture in a 5G network, which is same as FIG. 4.2.3-1 of 3GPP TS 23.501 V16.3.0, the disclosure of which is incorporated by reference herein in its entirety. The system architecture of FIG. 1b may comprise some exemplary elements such as AMF, SMF, AUSF, UDM, PCF, AF, NEF, UPF and NRF, (R) AN, SCP, etc. The network elements, reference points and interfaces as shown in FIG. 1b may be same as the corresponding network elements, reference points and interfaces as described in 3GPP TS 23.501 V16.3.0.

FIG. 1c schematically shows a high level architecture for service exposure for EPC (evolved packet core)-5GC (5G core) interworking, which is same as FIG. 4.3.5.1 1 of 3GPP TS 23.501 V16.3.0. For example, if the UE is capable of mobility between EPS (evolved packet system) and 5GS (5G system), the network is expected to associate the UE with an SCEF+NEF node for service capability exposure. The system architecture of FIG. 1c may comprise some exemplary elements such as AF/AS, SCEF+NEF, EPC node, NF, etc. The network elements and interfaces as shown in FIG. 1b may be same as the corresponding network elements and interfaces as described in 3GPP TS 23.501 V16.3.0.

The network exposure entity such as SCEF and NEF may provide a means to securely expose the services and capabilities provided by the network (such as 3GPP network) interfaces. The network exposure entity may provide a means for the discovery of the exposed services and capabilities. The network exposure entity may provide access to network capabilities through network application programming interfaces (e.g. Network APIs). The network exposure entity may abstract the services from the underlying network interfaces and protocols.

There may be various kinds of network exposure services. For example, monitoring capability may used be for monitoring of specific event for a terminal device in a network such as 4G/5G system and making such monitoring events information available for external exposure via the network exposure entity such as SCEF/NEF. The provisioning capability may used be for allowing external party to provision of information which can be used for the terminal device such as UE in the network such as 4G/5G system. The policy/charging capability may used be for handling QOS (quality of service) and charging policy for the terminal device such as UE based on the request from an external party. The analytics reporting capability may used be for allowing an external party to fetch or subscribe/unsubscribe to analytics information generated by the network such as 4G/5G system. Data capability may used be for allowing an external party to communicate with a terminal device such as UE via an application programming interface.

In an embodiment, the network exposure entity may support network exposure function and network exposure services as described in 3GPP TS 23.501 V16.3.0 (such as clause 6.2.5, clause 7.2.8 of 3GPP TS 23.501 V16.3.0).

In an embodiment, the network exposure entity may support the network exposure function as described in clause 4.4.8 of 3GPP TS 23.682 V16.5.0 (such as clause 4.4.8).

For data capability exposure, e.g. NIDD (non Internet protocol data delivery), Device Triggering, MSISDN-less MO SMS (mobile subscriber integrated services digital network less, mobile originated short message service), 3GPP has defined a standard procedure to identify UE (such as clause 5.13.1, section 5.2.1 and section 5.15 of 3GPP TS23.682 V16.5.0) and how to authenticate AS (such as clause 7.2.8 of 3GPP TR 23.722 V15.1.0, the disclosure of which is incorporated by reference herein in its entirety).

Figure 2:
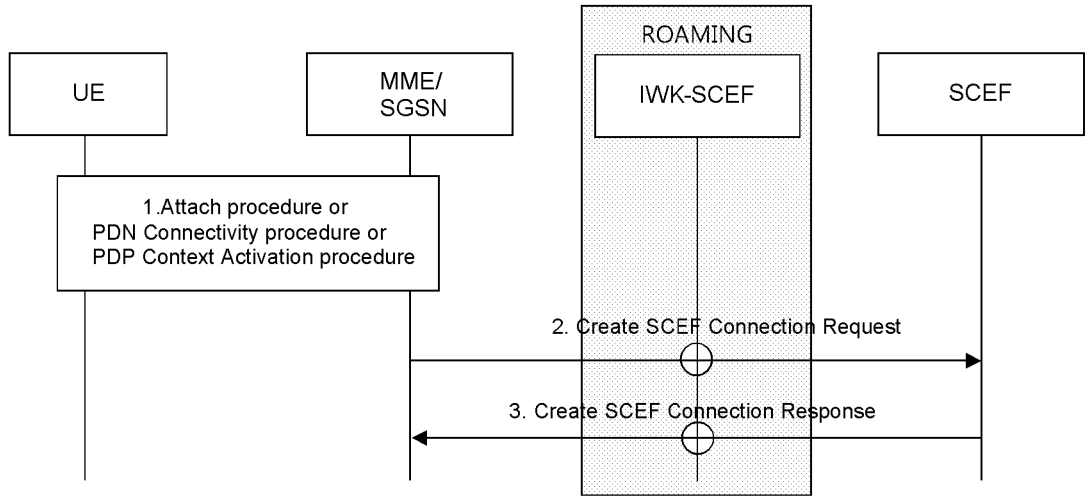
FIG. 2 shows a connection establishment procedure of NIDD.
Figure 5:
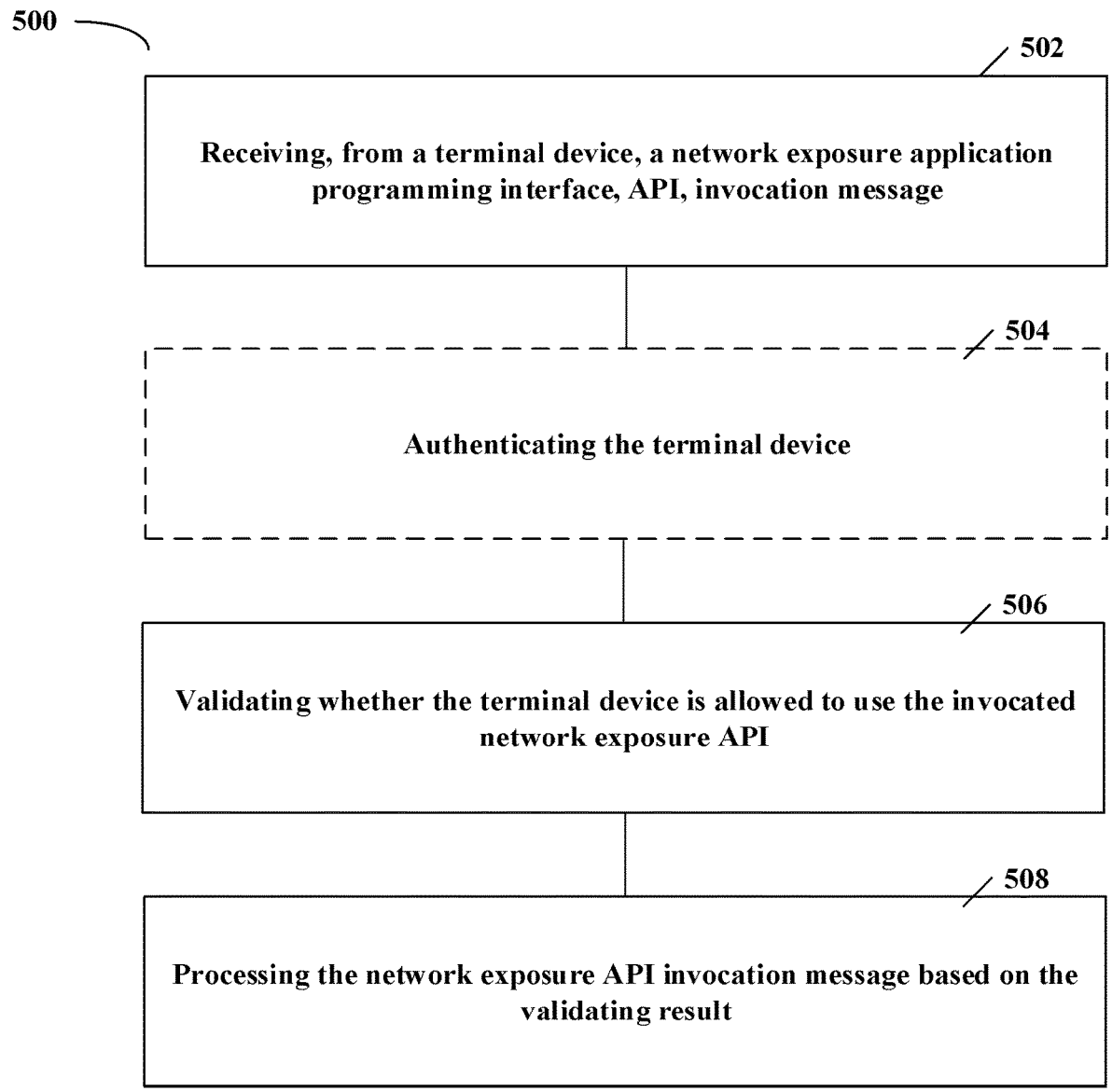
FIG. 5 shows a flowchart of a method according to an embodiment of the present disclosure.

FIG. 2 shows a connection establishment procedure of NIDD, which is same as the FIG. 5.13.1.2-1 of 3GPP TS23.682 V16.5.0. As shown in FIG. 2, before UE starts to communicate with AS, UE needs communicate with MME and attach to the network. During attachment, MME may inform SCEF and let SCEF to identify the UE. The steps as shown in FIG. 2 are same as the corresponding steps as described in clause 5.13.1.2 of 3GPP TS23.682 V16.5.0.

Figure 3:
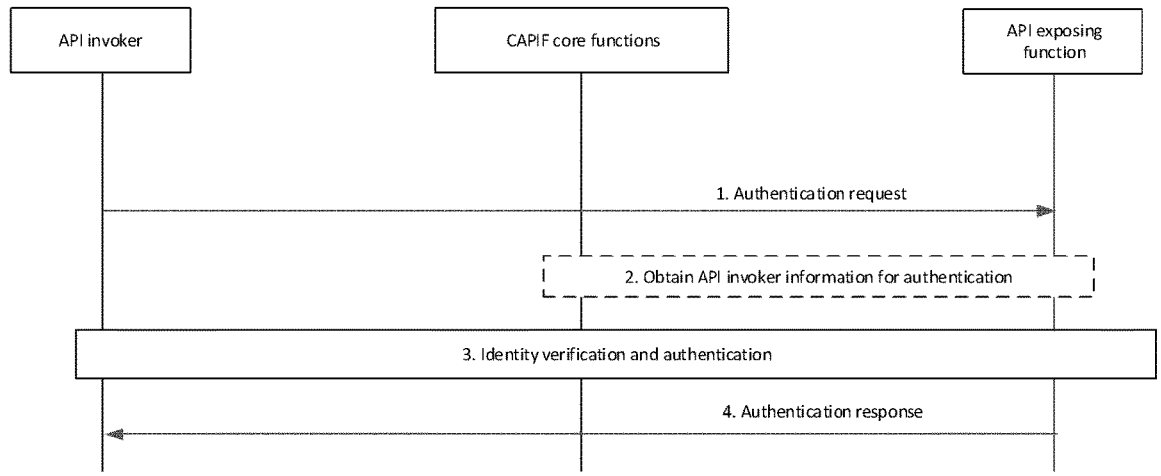
FIG. 3 shows a procedure for authentication between the API invoker and the AEF.
Figure 7:
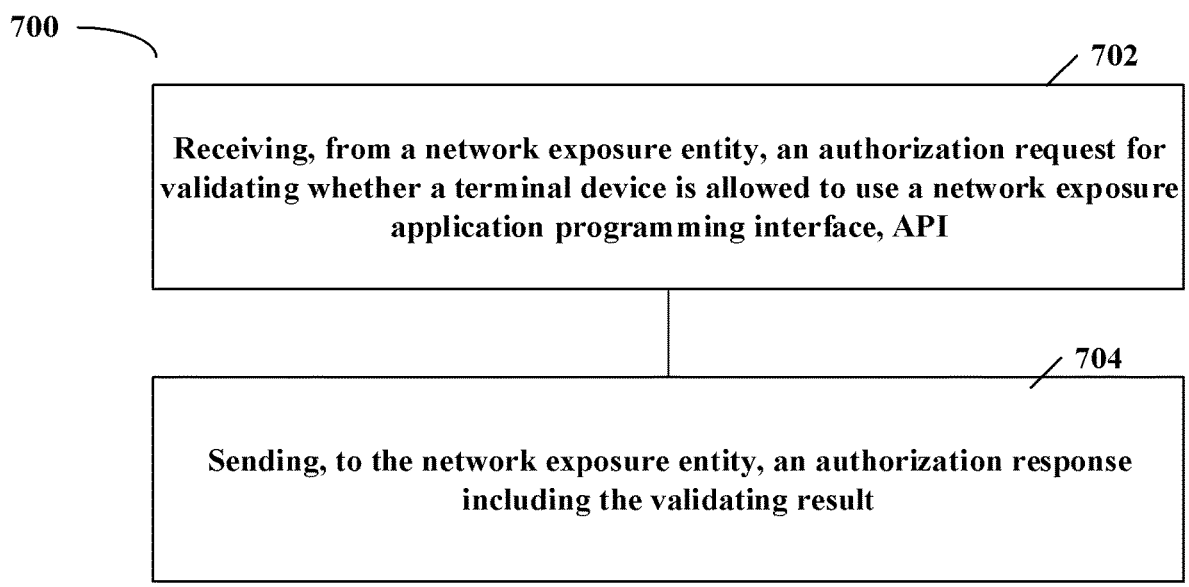
FIG. 7 shows a flowchart of a method according to another embodiment of the present disclosure.

FIG. 3 shows a procedure for authentication between the API invoker and the AEF (API Exposing Function), which is same of FIG. 7.2.8.1.2-1 of 3GPP TR 23.722 V15.1.0. The steps as shown in FIG. 3 are same as the corresponding steps as described in clause 7.2.8.1.2 of 3GPP TR 23.722 V15.1.0.

For some kinds of network exposure, when the network exposure entity such as SCEF exposes the network capabilities to AS, SCEF only needs to authenticate AS, there is no need to identify and authenticate UE.

To support some kinds of network exposure, the mechanisms in the 3GPP network are focus on network exposure to external 3rd party service provider such as SCS/AS hosting an application(s) via an API (i.e. N33 and T8), how does SCS/AS communicate with UE and authenticate UE are responsible for SCS/AS. SCEF doesn't need to authenticate UE. To secure the SCS/AS communicate with SCEF/NEF, 3GPP defines security requirement on 3GPP TS33.501 V16.1.0, the disclosure of which is incorporated by reference herein in its entirety:

Integrity protection, replay protection and confidentiality protection for communication between the SCEF/NEF and Application Function shall be supported.

Mutual authentication between the SCEF/NEF and Application Function shall be supported.

Internal 4G/5G Core information such as APN (Access Point Name)/DNN (Data Network Name), S-NSSAI (Single Network Slice Selection Assistance Information) etc., shall not be sent outside the 3GPP operator domain.

IMSI (International Mobile Subscriber Identity)/SUPI (Subscription Permanent Identifier) shall not be sent outside the 3GPP operator domain by SCEF/NEF.

FIG. 4 shows a diagram of how an UE application can use network exposure though SCS/AS. As shown in FIG. 4, the UE application may send a UE App (application) request to the SCS/AS and then the SCS/AS may send an API invocation request to SCEF/NEF. Therefore in the existing network exposure procedure, the SCEF/NEF can not expose network capability to UE directly.

However more and more exposure use cases may require that the network exposure entity such as SCEF/NEF can expose its services and network capability to UE directly.

Use Case1: UE Driven QoS Change

The network exposure entity such as SCEF/NEF supports a network exposure API to support of setting up an AS session with required QoS through AS/SCS/AF, however many Over The Top (OTT) providers may want to let their subscribers to change the QoS from the mobile applications (e.g. calling app, gaming app, etc.) directly to the network exposure entity.

Use Case2: UE Influence Traffic Routing

Edge computing enables operator and 3rd party services to be hosted close to the UE's access point of attachment, so as to achieve an efficient service delivery through the reduced end-to-end latency and load on the transport network. The network exposure entity such as SCEF/NEF supports a network exposure API to support influencing UPF (re) selection and allowing routing of user traffic from a close UPF to a local data network. In edge computing, OTT providers may want to let the device applications (e.g. autonomous driving APP, gaming APP) communicating with an edge computing application server, and make decision to influence traffic routing by themselves.

Use Case3: UE Driven Background Data Transfer

The network exposure entity such as SCEF/NEF supports a network exposure API to allow the 3rd party SCS/AS requesting a time window and related conditions from the network exposure entity for background data transfer to a set of UEs. After the transfer policies are negotiated, OTT providers may want to let device applications (e.g. map downloading app, Firmware Over-The-Air (FOTA)) to activates the negotiated transfer policy for the device itself.

Security on network expose API to UE may be different with network expose API to SCS/AS and is not defined in the 3GPP specification. For network exposure API to UE, there may be some security problems. For example, how to authenticate the UE? Comparing hundreds/thousands of SCS/ASs to be authenticated, to support exposing API to UE, there may be millions/billions of UEs to be authenticated by the network exposure entity. How to authorize the UE to use the network API? It may be not allowed every UE to use all network APIs exposed by the network exposure entity, therefore it may require a mechanism to authorize a particular UE to use a particular network API.

To overcome or mitigate the above mentioned problems or other problems, the embodiments of the present disclosure propose an improved network capability exposure solution which can enable a network exposure entity such as SCEF and NEF to expose network capability to a terminal device such as UE directly. In some embodiments herein, a data storage entity such as HSS/UDM can be used to store the API exposure subscription per UE, and the network exposure entity such as SCEF/NEF may be allowed to handle authorization and validation when the UE invokes a network exposure API exposed by the network exposure entity.

FIG. 5 shows a flowchart of a method 500 according to an embodiment of the present disclosure, which may be performed by an apparatus implemented in or at or as a network exposure entity such as SCEF and NEF or communicatively coupled to the network exposure entity. As such, the apparatus may provide means or modules for accomplishing various parts of the method 500 as well as means or modules for accomplishing other processes in conjunction with other components.

At block 502, the network exposure entity receives, from a terminal device, a network exposure API invocation message. The network exposure API invocation message may be any suitable network exposure API invocation message. In an embodiment, the network exposure API invocation message comprises at least one of an event exposure API invocation message; a packet flow description management API invocation message; a parameter provision API invocation message; a device triggering API invocation message; a background data transfer policy negotiation API invocation message; a traffic influence API invocation message; a chargeable party API invocation message; a quality of service API invocation message; a mobile subscriber integrated services digital network less (MSISDN-less), mobile originated short message service API invocation message; a service parameter provision API invocation message; an API support capability API invocation message; a non Internet protocol data delivery (NIDD) configuration API invocation message; a NIDD API invocation message; a network analytics exposure API invocation message; a user equipment radio capability management function provision API invocation message; an enhanced coverage restriction API invocation message; and an apply policy API invocation message. In an embodiment, when the network exposure entity is NEF, the network exposure API invocation message may be any of the network exposure API invocation messages of the NEF services as described in clause 5.2.6 of 3GPP TS 23.502 V16.3.0, the disclosure of which is incorporated by reference herein in its entirety. In an embodiment, when the network exposure entity is SCEF, the network exposure API invocation message may be any of the network exposure API invocation messages of the NEF services as described in clause 4.4.8 of 3GPP TS 23.682 V16.5.0.

At block 504 (optionally), the network exposure entity authenticates the terminal device. The network exposure entity may authenticate the terminal device in various ways. In an embodiment, the network exposure entity may authenticate the terminal device based on existing subscriber identity module (SIM) based authentication, such as GBA (Generic Bootstrapping Architecture) as described in 3GPP TS 33.220 V16.0.0, the disclosure of which is incorporated by reference herein in its entirety, EAP-AKA (Extensible Authentication Protocol-Authentication and Key Agreement), or any other authentication schemes. For example, when the terminal device is capable of connecting to 5GC and EPC, the UE has the ability to select which access network (e.g. LTE, NBIoT, Cat-M1, 5G NR) to connect to. If the UE selects the EPC, the UE may use security procedure as described in 3GPP TS33.401 V16.1.0, the disclosure of which is incorporated by reference herein in its entirety. Otherwise, if the UE selects 5GC, the UE may use the security procedures as described in 3GPP TS33.501 V16.1.0. For the network exposure entity which can connect to EPC and 5GC, the network exposure entity may choose the corresponding security procedures based on the UE selected type of core network, i.e., when EPC is selected, the network exposure entity may use security procedures as described in 3GPP TS33.401 V16.1.0. On the other hand, when 5GC is selected, the network exposure entity may use security procedures as described in 3GPP TS 33.501 V16.1.0.

At block 506, the network exposure entity validates whether the terminal device is allowed to use the invoked network exposure API. The network exposure entity may validate whether the terminal device is allowed to use the invoked network exposure API in various ways. For example, when the API exposure subscription data of a terminal device and/or a group of terminal devices is stored in the network exposure entity, the network exposure entity may validate whether the terminal device is allowed to use the invoked network exposure API by query the subscription data.

In an embodiment, the subscription data is stored or managed in or by another device such as HSS/UDM, the network exposure entity may validate whether the terminal device is allowed to use the invoked network exposure API by sending, to a data management entity, an authorization request for validating whether the terminal device is allowed to use the invoked network exposure API and receiving, from the data management entity, an authorization response including the validating result. For example, if the validation is passed, the data management entity such as HSS/UDM may give a successful response back to the network exposure entity such as SCEF/NEF. Otherwise, the data management entity may give a failure response back to the network exposure entity.

The authorization request may include any suitable information which can be used to validate whether the terminal device is allowed to use the invoked network exposure API. In an embodiment, the authorization request may include a user identity of the terminal device and an identity of the invoked network exposure API. The user identity of the terminal device may be the subscriber identifier of the terminal device. In an embodiment, the authorization request may include an application identifier of the terminal device. In an embodiment, the authorization request may include a type of the terminal device.

In an embodiment, when one or more network exposure APIs are allowed to any terminal device, the network exposure entity may store this information and validates whether the terminal device is allowed to use this network exposure API by itself.

In an embodiment, the data management entity may comprise at least one of a UDM and a HSS. For example, the data management entity may be UDM or HSS or UDM+HSS.

In an embodiment, information that what API can be exposed to the terminal device is stored in subscription data of the terminal device. The subscription data of the terminal device may be store in any suitable network device such as HSS or UDR which can be accessed by UDM.

At block 508, the network exposure entity may process the network exposure API invocation message based on the validating result. For example, if the validation is passed, the network exposure entity may send an API request to a corresponding network entity. If the validation is failed, the network exposure entity may send a failure response of the network exposure API invocation message to the terminal device. In an embodiment, when the network exposure API invocation message is a network exposure API invocation message as described in 3GPP TS 23.682 V16.5.0 and 3GPP TS 23.502 V16.3.0, the network exposure entity may process the network exposure API invocation message as described in the 3GPP TS 23.682 V16.5.0 and 3GPP TS 23.502 V16.3.0.

Figure 6:
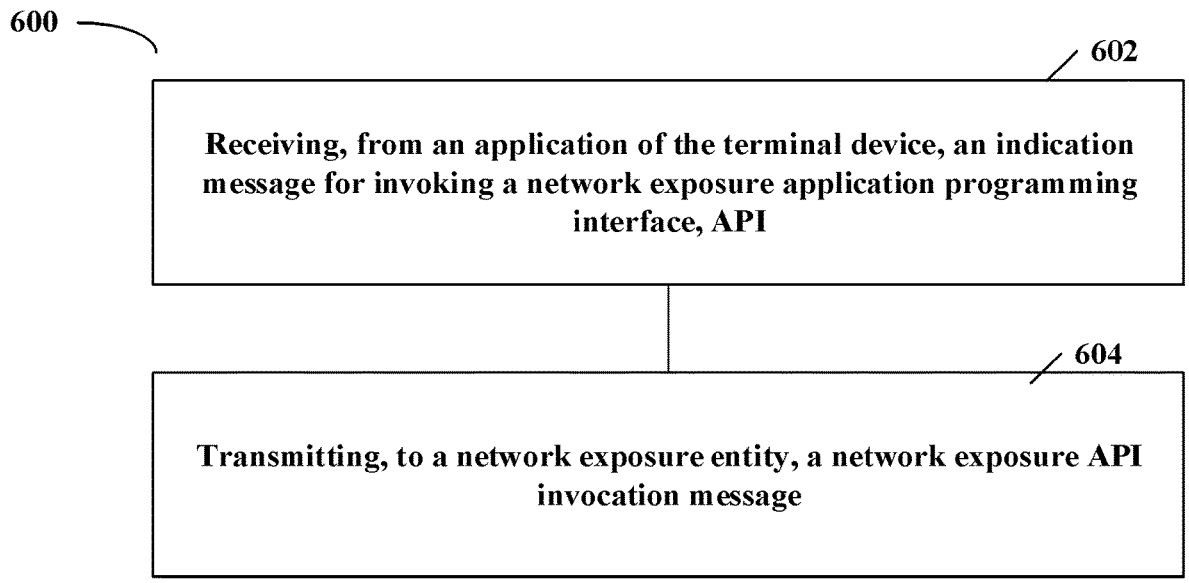
FIG. 6 shows a flowchart of a method according to another embodiment of the present disclosure.

FIG. 6 shows a flowchart of a method 600 according to another embodiment of the present disclosure, which may be performed by an apparatus implemented in or at or as a terminal device such as UE or communicatively coupled to the terminal device. As such, the apparatus may provide means or modules for accomplishing various parts of the method 600 as well as means or modules for accomplishing other processes in conjunction with other components. For some parts which have been described in the above embodiments, detailed description thereof is omitted here for brevity.

At block 602, the terminal device receives, from an application of the terminal device, an indication message for invoking a network exposure API. The application of the terminal device may be any suitable application which can use the service provided by the network exposure entity. In an embodiment, the terminal device may validate whether the application is allowed to invoke the network exposure API. When the application is not allowed to invoke the network exposure API, the terminal device may provide an indication that the application is not allowed to invoke the network exposure API to the application. The indication message may include any suitable parameter(s) which can be used in the network exposure API invocation message.

At block 604, the terminal device may transmit, to a network exposure entity, a network exposure API invocation message.

In an embodiment, whether the terminal device is allowed to use the invoked network exposure API may be validated by the network exposure entity with a help of a data management entity.

In an embodiment, a user identity of the terminal device and an identity of the invoked network exposure API may be used to validate whether the terminal device is allowed to use the invoked network exposure API.

In an embodiment, an application identifier of the terminal device may be further used to validate whether the terminal device is allowed to use the invoked network exposure API.

In an embodiment, the data management entity may comprise at least one of a UDM entity and a HSS.

In an embodiment, the terminal device may be authenticated by the network exposure entity.

In an embodiment, the terminal device may be authenticated by the network exposure entity based on subscriber identity module based authentication.

In an embodiment, the network exposure API invocation message may comprise at least one of an event exposure API invocation message; a packet flow description management API invocation message; a parameter provision API invocation message; a device triggering API invocation message; a background data transfer policy negotiation API invocation message; a traffic influence API invocation message; a chargeable party API invocation message; a quality of service API invocation message; a mobile subscriber integrated services digital network less, MSISDN-less, mobile originated short message service API invocation message; a service parameter provision API invocation message; an API support capability API invocation message; a non Internet protocol data delivery, NIDD, configuration API invocation message; a NIDD API invocation message; a network analytics exposure API invocation message; a user equipment radio capability management function provision API invocation message; an enhanced coverage restriction API invocation message; and an apply policy API invocation message.

In an embodiment, the network exposure entity may comprise at least one of a service capability exposure function, SCEF, entity; and a network exposure function, NEF, entity.

In an embodiment, information that what API can be exposed to the terminal device may be stored in subscription data of the terminal device.

FIG. 7 shows a flowchart of a method 700 according to another embodiment of the present disclosure, which may be performed by an apparatus implemented in or at or as a data management entity such as HSS/UDM or communicatively coupled to the data management entity. As such, the apparatus may provide means or modules for accomplishing various parts of the method 700 as well as means or modules for accomplishing other processes in conjunction with other components. For some parts which have been described in the above embodiments, detailed description thereof is omitted here for brevity. The information that what API can be exposed to the terminal device is stored in subscription data of the terminal device which may be managed by the data management entity such as HSS/UDM.

At block 702, the data management entity may receive, from a network exposure entity, an authorization request for validating whether a terminal device is allowed to use a network exposure API.

The data management entity may query the subscription data of the terminal device and send, to the network exposure entity, an authorization response including the validating result at block 704.

Figure 8:
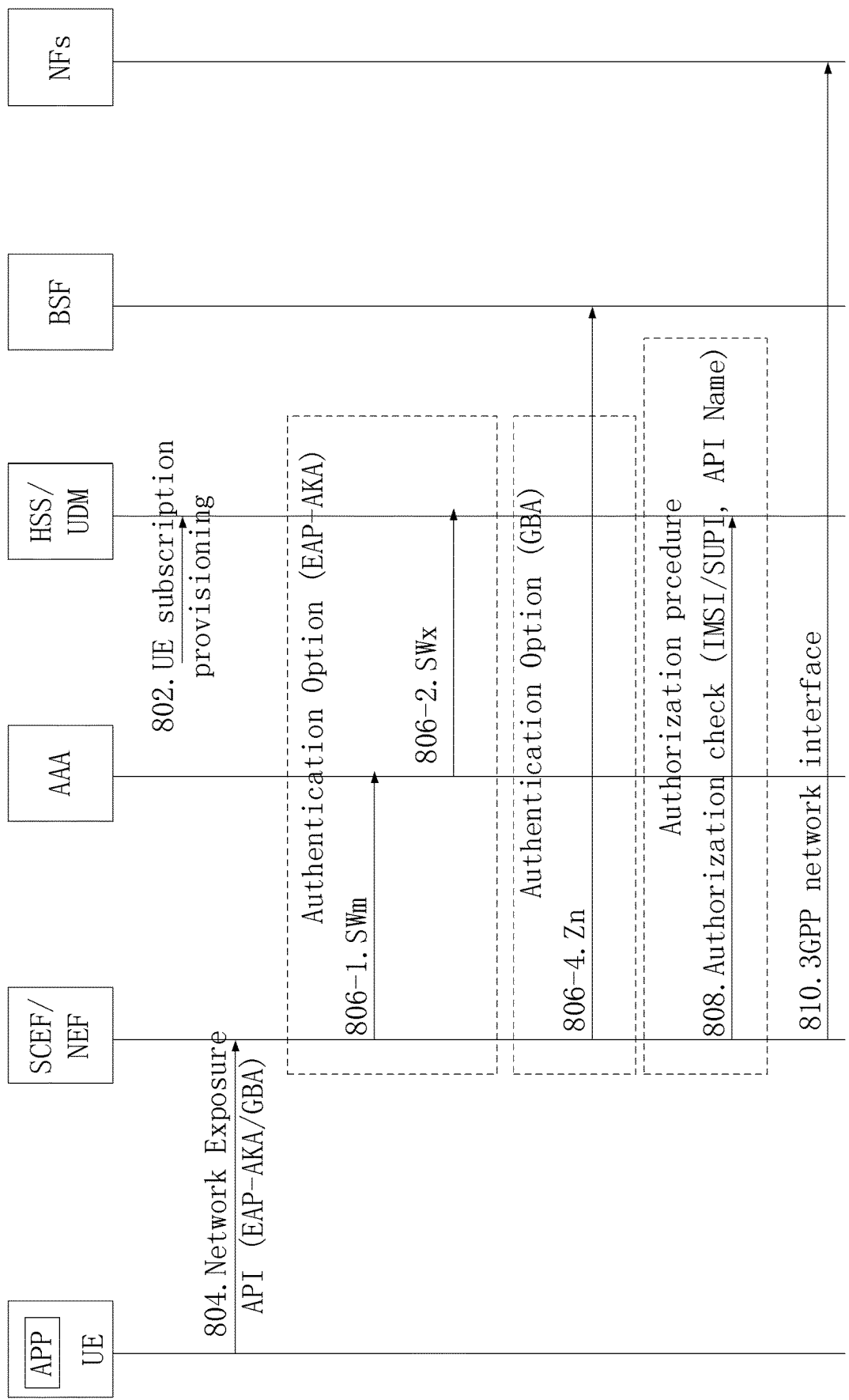
FIG. 8 shows a flowchart of a method according to another embodiment of the present disclosure.

FIG. 8 shows a flowchart of a method according to another embodiment of the present disclosure. This embodiment is implemented in the 3GPP network.

At step 802, UE subscription data may be provisioned into the HSS/UDM. The UE subscription data may include the information that what API can be exposed to the UE. HSS/UDM may store or manage the UE subscription data for further API exposure authorization.

At step 804, the UE may receive, from an application of the terminal device, an indication message for invoking a network exposure API and send, to the SCEF/NEF, a network exposure API invocation message. UE may also pass the application identifier (ID) of UE application to SCEF/NEF which may use the application ID for various purposes such as policy control and charging purpose and/or validation purpose, etc.

The UE may be authenticated by the SCEF/NEF based on existing SIM based authentication, e.g. GBA, EAP-AKA. For example, at steps 806-1 and 806-2, the UE may be authenticated by the SCEF/NEF based on EAP-AKA. The SWm reference point is located between AAA server and SCEF/NEF and may be used for transport of authentication data. The SWx reference point is located between AAA server and HSS/UDM and may be used for transport of authentication data. At step 806-4, the UE may be authenticated by the SCEF/NEF based on GBA. The AAA may be AUSF. The BSF denotes bootstrapping server function. Zn denotes an interface between BSF and SCEF/NEF.

At step 808, the SCEF/NEF may call an authorization API (e.g., authorization check (IMSI/SUPI, API name)) exposed from HSS/UDM to authorize the network exposure API invocation message and SCEF/NEF may apply additional policies to control the UE to use the Network Exposure API, e.g. quota or throttling. HSS/UDM may query the UE subscription data, and validate if the UE is allowed to use the requested network exposure API. If the validation is passed, HSS/UDM may give a successful response back to SCEF/NEF.

At step 810, after the authorization is successfully checked, SCEF/NEF may comply with a standard flow for example as defined in 3GPP TS23.502 V15.4.1 and 3GPP TS 23.682 V16.5.0 to send an API request to a corresponding network function entity.

For example, an example use case may be as following. Application Function Influence on Traffic Routing is a capability introduced in NEF, which allows the application to influence UPF (re) selection and route user traffic to a local access to a Data Network (identified by a DNAI (DN(Data Network) Access Identifier)). The application may exist in the UE, and the application in UE may want to use the feature of Application Function Influence on Traffic Routing. Based on some proposed embodiments, Application Function Influence on Traffic Routing capability may be provisioned into HSS for a particular UE, which allows the UE to use this capability. For example, when the application is a gaming application, the application can use the Application Function Influence on Traffic Routing capability to enhance the gaming user experience. When the subscriber starts the game application, the game application can call Application Function Influence on Traffic Routing API to NEF via the UE. When the NEF receives the API request from the UE, NEF may authenticate the UE via GBA or EAP-AKA. After the UE is authenticated, the NEF may call the authorization API to UDM and authorize if the UE can use the Application Function Influence on Traffic Routing API. If both authentication and authorization are passed, the NEF may follow a 3GPP standard flow to communicate with PCF to apply the traffic routing request.

In an embodiment, a new interface in HSS/UDM may be added to allow SCEF/NEF to check if the UE is allowed to use the network exposure API exposed by the SCEF/NEF.

The various blocks shown in FIGS. 5-7 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Embodiments herein afford many advantages, of which a non-exhaustive list of examples follows. In some embodiments herein, a solution to secure the end-to-end procedure of API exposure to terminal device is provided. In some embodiments herein, the provided solution can enable the network exposure entity such as SCEF/NEF to expose its service and network capability to the terminal device directly. In some embodiments herein, the application in the terminal device may avoid using the AF/AS/SCS to invoke the network exposure API which may be benefit in some cases such as the AF/AS/SCS cannot support to invoke the network exposure API and can simplify the procedure of network exposure to UE. The embodiments herein are not limited to the features and advantages mentioned above. A person skilled in the art will recognize additional features and advantages upon reading the following detailed description.

Figure 9:
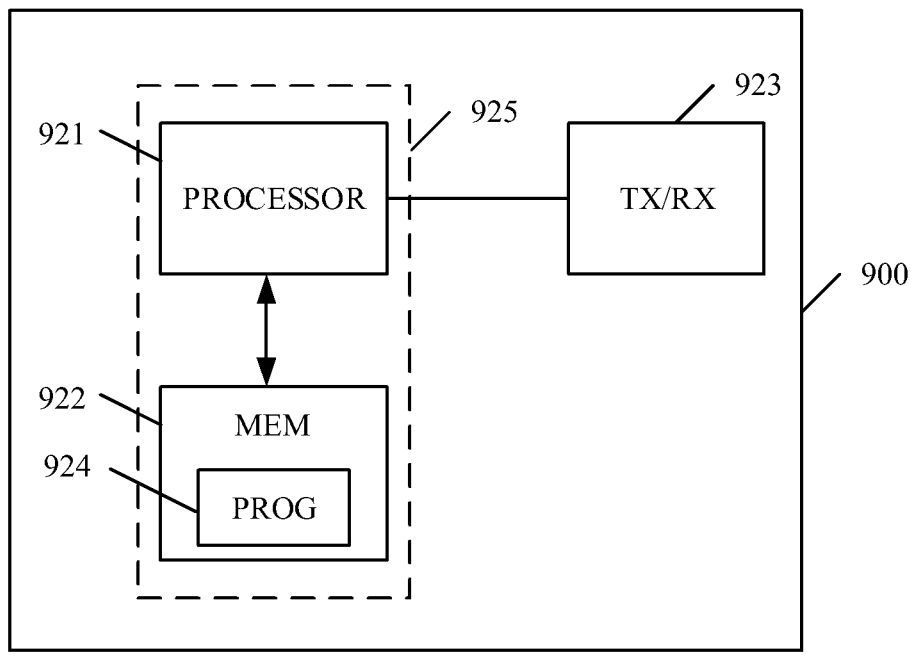
FIG. 9 is a block diagram showing an apparatus suitable for practicing some embodiments of the disclosure.

FIG. 9 is a block diagram showing an apparatus suitable for practicing some embodiments of the disclosure. For example, any one of the network exposure entity, the terminal device and the data management entity described above may be implemented as or through the apparatus 900.

The apparatus 900 comprises at least one processor 921, such as a DP, and at least one MEM 922 coupled to the processor 921. The apparatus 920 may further comprise a transmitter TX and receiver RX 923 coupled to the processor 921. The MEM 922 stores a PROG 924. The PROG 924 may include instructions that, when executed on the associated processor 921, enable the apparatus 920 to operate in accordance with the embodiments of the present disclosure. A combination of the at least one processor 921 and the at least one MEM 922 may form processing means 925 adapted to implement various embodiments of the present disclosure.

Various embodiments of the present disclosure may be implemented by computer program executable by one or more of the processor 921, software, firmware, hardware or in a combination thereof.

The MEM 922 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 921 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the network exposure entity, the memory 922 contains instructions executable by the processor 921, whereby the network exposure entity operates according to any of the method 500 as described in reference to FIG. 5.

In an embodiment where the apparatus is implemented as or at the terminal device, the memory 922 contains instructions executable by the processor 921, whereby the terminal device operates according to the method 600 as described in reference to FIG. 6.

In an embodiment where the apparatus is implemented as or at the data management entity, the memory 922 contains instructions executable by the processor 921, whereby the data management entity operates according to the method 700 as described in reference to FIG. 7.

Figure 10:
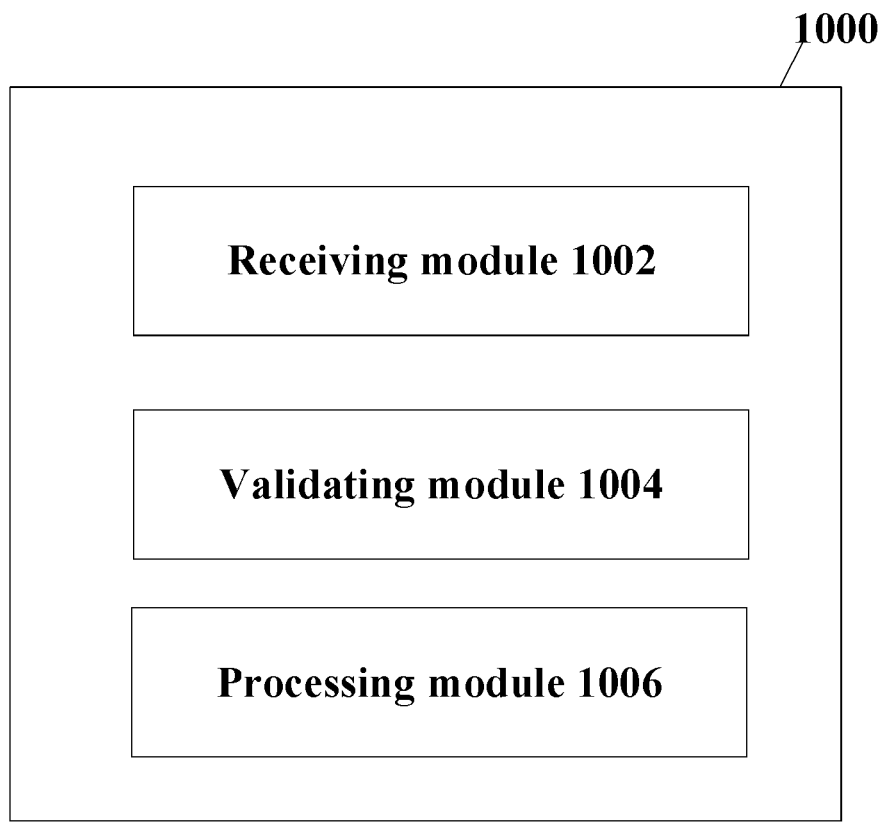
FIG. 10 is a block diagram showing a network exposure entity according to an embodiment of the disclosure.

FIG. 10 is a block diagram showing a network exposure entity according to an embodiment of the disclosure. As shown, the network exposure entity 1000 comprises a receiving module 1002, a validating module 1004 and a processing module 1006. The receiving module 1002 may be configured to receive, from a terminal device, a network exposure application programming interface, API, invocation message. The validating module 1004 may be configured to validate whether the terminal device is allowed to use the invocated network exposure API. The processing module 1006 may be configured to process the network exposure API invocation message based on the validating result.

Figure 11:
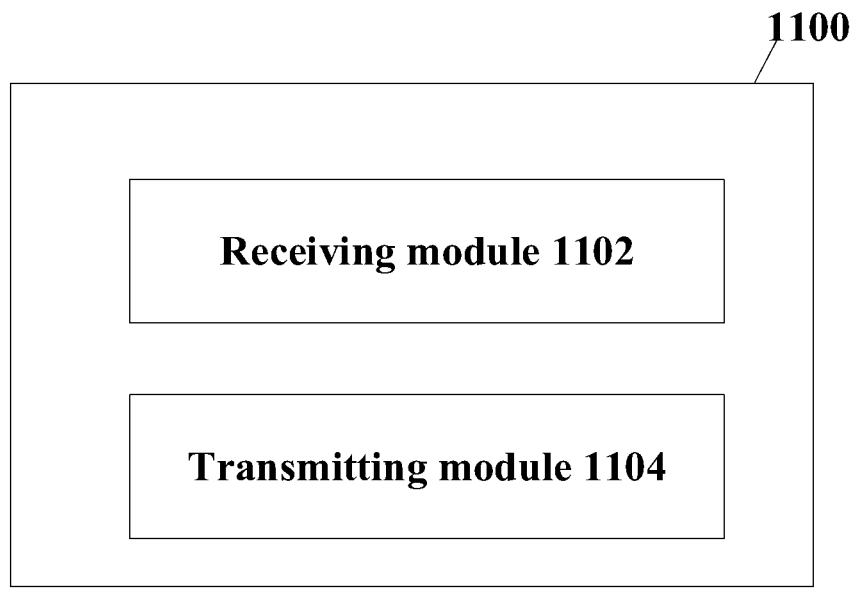
FIG. 11 is a block diagram showing a terminal device according to an embodiment of the disclosure.

FIG. 11 is a block diagram showing a terminal device according to an embodiment of the disclosure. As shown, the terminal device 1100 comprises a receiving module 1102 and a transmitting module 1104. The receiving module 1102 may be configured to receive, from an application of the terminal device, an indication message for invoking a network exposure application programming interface, API. The transmitting module 1104 may be configured to transmit, to a network exposure entity, a network exposure API invocation message.

Figure 12:
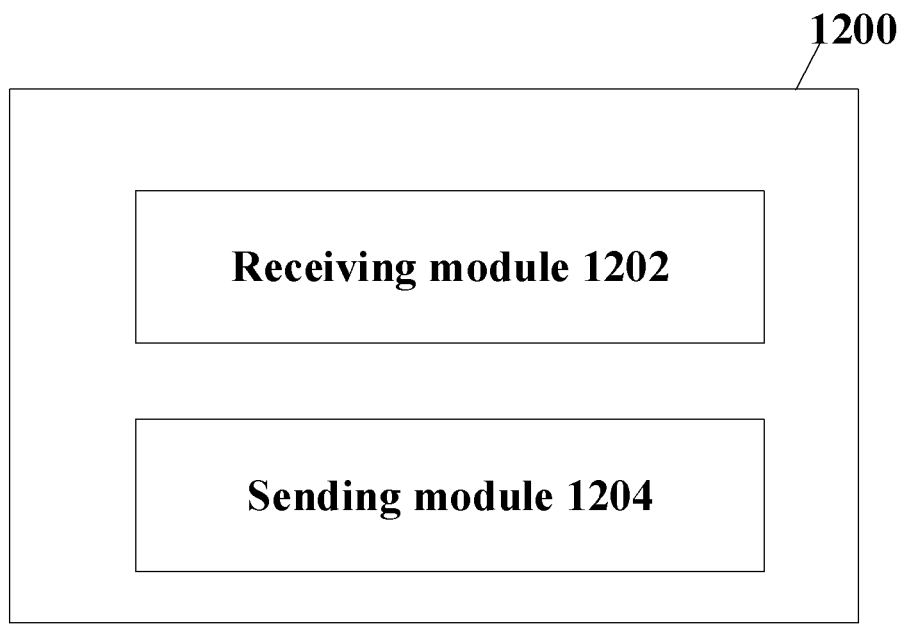
FIG. 12 is a block diagram showing a data management entity according to an embodiment of the disclosure.

FIG. 12 is a block diagram showing a data management entity according to an embodiment of the disclosure. As shown, the data management entity 1200 comprises a receiving module 1202 and a sending module 1204. The receiving module 1202 may be configured to receive, from a network exposure entity, an authorization request for validating whether a terminal device is allowed to use a network exposure application programming interface, API. The sending module 1204 may be configured to send, to the network exposure entity, an authorization response including the validating result.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the network exposure entity, the terminal device or the data management entity may not need a fixed processor or memory, any computing resource and storage resource may be arranged from the network exposure entity, the terminal device or the data management entity in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform one or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:
1. A method at a network exposure entity, comprising:
receiving, from a terminal device, a network exposure application programming interface (API) invocation message;
validating whether the terminal device is allowed to use an invocated network exposure API; and processing the network exposure API invocation message based on a validating result.

2. The method according to claim 1, wherein the validating whether the terminal device is allowed to use the invoked network exposure API comprises:
sending, to a data management entity, an authorization request for validating whether the terminal device is allowed to use the invoked network exposure API; and
receiving, from the data management entity, an authorization response including the validating result.

3. The method according to claim 2, wherein the authorization request includes a user identity of the terminal device and an identity of the invoked network exposure API.

4. The method according to claim 3, wherein the authorization request further includes an application identifier of the terminal device.

5. The method according to claim 2, wherein the data management entity comprises at least one of a unified data management (UDM) entity and a home subscriber server (HSS).

6. The method according to claim 1, further comprising: authenticating the terminal device.

7. The method according to claim 6, wherein the terminal device is authenticated based on subscriber identity module based authentication.

8. The method according to claim 1, wherein the network exposure API invocation message comprises at least one of:
an event exposure API invocation message;
a packet flow description management API invocation message;
a parameter provision API invocation message;
a device triggering API invocation message;
a background data transfer policy negotiation API invocation message;
a traffic influence API invocation message;
a chargeable party API invocation message;
a quality of service API invocation message;
a mobile subscriber integrated services digital network less (MSISDN-less) mobile originated short message service API invocation message;
a service parameter provision API invocation message;
an API support capability API invocation message;
a non-Internet protocol data delivery (NIDD) configuration API invocation message;
a NIDD API invocation message;
a network analytics exposure API invocation message;
a user equipment radio capability management function provision API invocation message;
an enhanced coverage restriction API invocation message; and
an apply policy API invocation message.

9. The method according to claim 1, wherein the network exposure entity comprises at least one of:
a service capability exposure function (SCEF) entity; and
a network exposure function (NEF) entity.

10. The method according to claim 1, wherein information that what API can be exposed to the terminal device is stored in subscription data of the terminal device.

11. A method at a terminal device, comprising:
receiving, from an application of the terminal device, an indication message for invoking a network exposure application programming interface (API); and
transmitting, to a network exposure entity, a network exposure API invocation message.

12. The method according to claim 11, wherein whether the terminal device is allowed to use an invoked network exposure API is validated by the network exposure entity with a help of a data management entity.

13. The method according to claim 12, wherein a user identity of the terminal device and an identity of the invoked network exposure API are used to validate whether the terminal device is allowed to use the invoked network exposure API.

14. The method according to claim 13, wherein an application identifier of the terminal device is further used to validate whether the terminal device is allowed to use the invoked network exposure API.

15. The method according to claim 12, wherein the data management entity comprises at least one of a unified data management (UDM) entity and a home subscriber server (HSS).

16. The method according to claim 11, wherein the terminal device is authenticated by the network exposure entity.

17. The method according to claim 16, wherein the terminal device is authenticated by the network exposure entity based on subscriber identity module based authentication.

18. The method according to claim 11, wherein the network exposure API invocation message comprises at least one of:
an event exposure API invocation message;
a packet flow description management API invocation message;
a parameter provision API invocation message;
a device triggering API invocation message;
a background data transfer policy negotiation API invocation message;
a traffic influence API invocation message;
a chargeable party API invocation message;
a quality of service API invocation message;
a mobile subscriber integrated services digital network less (MSISDN-less) mobile originated short message service API invocation message;
a service parameter provision API invocation message;
an API support capability API invocation message;
a non-Internet protocol data delivery (NIDD) configuration API invocation message;
a NIDD API invocation message;
a network analytics exposure API invocation message;
a user equipment radio capability management function provision API invocation message;
an enhanced coverage restriction API invocation message; and
an apply policy API invocation message.

19. A terminal device, comprising:
a processor; and
a memory coupled to the processor, said memory containing instructions which, when executed by said processor, cause said terminal device to:
receive, from an application of the terminal device, an indication message for invoking a network exposure application programming interface (API); and
transmit, to a network exposure entity, a network exposure API invocation message.

20. The terminal device according to claim 19, wherein whether the terminal device is allowed to use an invoked network exposure API is validated by the network exposure entity with a help of a data management entity.

* * * * *